United States Patent Office 3,554,870
Patented Jan. 12, 1971

---

3,554,870
PROCESS FOR PREPARING ESTROLOLACTONE
Samuel C. Pan, Metuchen, Joan Semar, Somerset, Pacifico A. Principe, South River, and Leonard J. Lerner, New Brunswick, N.J., assignors to E. R. Squibb & Sons, Inc., New York, N.Y., a corporation of Delaware
No Drawing. Filed Apr. 1, 1968, Ser. No. 717,936
Int. Cl. C07c *167/14*
U.S. Cl. 195—51     1 Claim

ABSTRACT OF THE DISCLOSURE

Estrololactone is prepared by subjecting 19-nortestololactone to the action of a 1-dehydrogenating microorganism.

---

This invention relates to the preparation of estrololactone and a novel intermediate, 19-nortestololactone, utilized in the preparation thereof. More particularly, this invention relates to the microbiological preparation of estrololactone.

It is well known that the end product of this invention can be synthesized chemically, i.e., by the oxidation of estrone with alkaline hydrogen peroxide. This product has also been prepared microbiologically by subjecting 19-norprogesterone to the action of microorganisms. The novel process discovered herein relates to the microbial action on the novel 19-nortestololactone intermediate of this invention. This intermediate has been found to possess anti-androgenic activity and as such can be utilized in the treatment of hyperandrogenic acne. It also may be utilized in a manner similar to that of aldosterone.

The end product of the invention is prepared microbiologically by subjecting 19-nortestosterone or 19-nor-$\Delta^4$-androstene-3,17-dione to the enzymes of the microorganism *Aspergillus tamarii*. From this step is recovered by known means the novel intermediate, 19-nortestololactone. By subjecting this intermediate to the action of a 1-dehydrogenating microorganism, e.g., *Corynebacterium simplex*, the product recovered is the desired estrololactone. In addition to the above 1-dehydrogenator, others that may be utilized in the practice of this invention are *Nocardia restrictus, Pseudomonas testosteroni, Cylindrocarpon radicicola* and *Mycobacterium rhodochrous*.

The estrololactone product possesses anti-estrogenic activity and therefore would be used in breast and uterine tumors. It can be tableted by known methods and administered in from 0.10 mg. to 10.0 mg./kg. of body weight per day administered to humans and from 0.05 mg. to 5 mg./kg. of body weight per day when administered to animals (e.g., cows, rabbits or rats).

The compounds can be administered in tablet form as stated above or as an injectable. In such a case they are dissolved in a vegetable oil (e.g., sesame) or saline and administered parenterally.

In general, the conditions of culturing the microorganisms of this invention are the same as those of culturing various other bacteria for production of organic acids or glycols, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose starch or dextrin), a fatty acid, a fat and/or the steroid itself. Preferably, however, the medium includes an assimilable source of carbon and energy in addition to the steroid. The source of nitrogenous factors may be organic (e.g., soybean meal, corn steep liquor, meat extract and/or distillers' solubles) or synthetic (i.e., composed of simple, synthesizable organic and inorganic compounds such as ammonium salts, alkali nitrates, amino acids or urea).

An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation.

As mentioned above when the starting material is subjected to the enzymes of the microorganism *Aspergillus tamarii*, 19-nortestololactone is recovered. It is also possible to recover this novel intermediate by utilizing any of the following lactone-producing organisms: *Aspergillus flavipes, Penicillium chrysogenum, Penicillium citrinum* and *Penicillium lilacium*.

The following examples illustrate the invention (all temperatures being in degrees centigrade).

EXAMPLE 1

19-nortestololactone (A) *Fermentation.*—Surface growth from each of two 10-day-old agar slant cultures of *Aspergillus tamarii* (ATCC 10836), the slant containing as a nutrient medium (A):

|  | G. |
|---|---|
| Glucose | 10 |
| Yeast extract | 2.5 |
| $K_2HPO_4$ | 1 |
| Agar | 20 |
| Distilled water to 1 liter. | | is suspended in 5 ml. of a 0.01% sodium lauryl sulfate aqueous solution. One ml. portions of the suspension are used to inoculate eight 250 ml. conical flasks, each containing 50 ml. of the following sterilized medium (B):

|  | G. |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Distilled water to 1 liter. | |

After forty-eight hours of incubation at 25° C. with continuous rotary agitation (280 cycles/minute; 2-inch stroke) 5% (vol./vol.), transfers are made to fifty 250 ml. conical flasks each containing 50 ml. freshly sterilized medium (B):

After twenty-four hours of incubation, using the same conditions as described above, the steroid (200 micrograms/ml.) is added by supplementing each flask with 0.25 ml. of a sterile solution (40 mg./ml.) of 19-nor-$\Delta^4$-androstene-3,7-dione in N,N-dimethylformamide. A total of 500 mg. is fermented. After twenty-six hours of further incubation using identical conditions as described above, the fermentation is harvested. The contents of the flasks are pooled, acidified to pH 2 with sulfuric acid, and filtered through a Seitz clarifying pad. The filtrate has a volue of 2700 ml.

(B) *Isolation and characterization.*—The combined filtrate and washings (2700 ml.) are extracted three times with 800 ml. portions of methyl iso-butyl ketone. The combined methyl iso-butyl ketone extracts are washed with water, dried over anhydrous sodium sulfate and concentrated to dryness under vacuum leaving about 300 mg. of crude product. This material is chromatographed on six 16″ x 8″ glass plates coated with a thin layer of Silica Gel GF (Merck), 1 mm. in thickness, with chloroform containing 5% (by volume) methanol as the developing solvent. The UV-absorbing band, moving with three-quarters the mobility of the substrate, i.e., 19-norandrostenedione, is eluted with a 1:1 (by volume) mixture of methanol and chloroform. After evaporating off the solvent the residue is partitioned between chloroform and a 1:1 (by volume) mixture of water and methanol. The chloroform phase, upon evaporation under vacuum to dryness, yields crystalline 19-nortestololactone. It is recrystallized from acetone-hexane to yield about 200 mg. of the pure product, M.P. about 197°; $[\alpha]_D$—11.9° (C 1.0, $CHCl_3$); C 74.88% (calc'd 74.97), H 8.44% (calc'd 8.39);

$\lambda_{max.}^{EtOH}$ 238 m$\mu$ ($\epsilon$ 18,000); $\lambda_{max.}^{KBr.}$ 1723, 1652, 1610 cm.$^{-1}$ NMR signals (in $CDCl_3$ with TMS standard), 8.67$\tau$, 4.16$\tau$.

EXAMPLE 2

Following the procedure of Example 1, but substituting an equivalent amount of 19-nortestosterone for the 19-nor-$\Delta^4$-androstene-3,17-dione, 19-nortestololactone is also obtained.

EXAMPLE 3

Estrololactone by growing culture of *Corynebacterium simplex*

(A) Fermentation.—Surface growth from a two-week-old agar slant of *Corynebacterium simplex* (ATCC 6946), the slants containing as a nutrient medium (A):

| | G. |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

| | G. |
|---|---|
| Beef extract | 1.5 |
| Yeast extract | 3 |
| Peptone | 6 |
| Dextrose | 1 |

Distilled water to 1 liter.

After twenty-four hours of incubation at 25° C. with continuous rotary agitation (280 cycles/minute; 2-inch stroke), 5% (vol./vol.) transfers are made to eight 250 ml. Erlenmeyer flasks, twenty-four hours of further incubation, using the same conditions as described above, the steroid (500 micrograms/ml.) is added by supplementing each flask with 0.25 ml. of a sterile solution (100 mg./ml.) of 19-nortestololactone in N,N-dimethylformamide. A total of 200 mg. is fermented. After forty-eight hours of further incubation, using identical conditions as described above, the contents of the flasks are pooled, the broth is acidified to pH 2.0 with sulfuric acid and extracted twice with 200 ml. portions of methyl isobutyl ketone (MIBK). The MIBK phase in which all the bacterial cells are suspended is centrifuged. The cell sediment is shaken with 50 ml. of acetone and after centrifuging, the cells are shaken twice with 50 ml. portions of a 1:1 mixture of methanol and chloroform, with the cells centrifuged off each time. The MIBK, acetone, and methanol-chloroform extracts are combined. The combined extract is dried over anhydrous $Na_2SO_4$ and evaporated under vacuum to dryness. The crystalline residue of estrololactone is recrystallized three times from acetone to yield 110 mg. of the pure product, M.P. 337°;

$\lambda_{max.}^{MeOH-CHCl_3}$ 281 m$\mu$ ($\epsilon$ 2,050), 285 m$\mu$ ($\epsilon$ 1880)

EXAMPLE 4

Estrololactone by washed cells of *Corynebacterium simplex*

Following the procedure of Example 3 with the exception that testosterone is used in place of 19-nortestololactone, the cells of the culture of *Corynebacterium simplex* are harvested at the end of seventy-two hours by centrifugation. The packed cells are washed three times with a phosphate buffer containing 0.005 mole each of $KH_2PO_4$ and $Na_2H_2P_2O_7$ per liter and adjusted to pH 7.0. The washed cells are then suspended in the same phosphate buffer to a volume equal to one-quarter of the volume of the original culture. The substrate, 19-nortestololactone and the hydrogen acceptor, e.g., 2-methylnaphthoquinone are added as their solutions in ethanol to give final concentrations of 100 $\mu$g./ml. and 0.4 mM., respectively, the quantity of ethanol introduced being held within 5% of the total. The reaction mixture is allowed to stand at 30° for four to six hours, after which it is extracted with MIBK, acetone, and methanol-chloroform in exactly the same manner as described in Example 3. The combined extract is also processed in exactly the same manner as described in Example 3 to give pure estrololactone of M.P. 337°.

EXAMPLE 5

Estrololactone by acetone-dried cells of *Corynebacterium simplex*

Following the procedure of Example 4, the packed cells are diluted with an equal volume of phosphate buffer of pH 7.0. This cell suspension is added dropwise, with constant stirring, into ten times its volume of acetone which is chilled at a temperature not above 5° C. The deposit on the bottom is immediately filtered on a Buchner funnel with suction, washed with a small volume of acetone and then air dried. A suspension of 10 mg. of the acetone-dried cells per ml. of the pH 7.0 buffer prepared by blending the cells with the buffer in a Waring blender is used in place of the suspension of the washed cells in the Example 4. The substrate and the hydrogen acceptor are added in the same manner as described therein. Following the same procedure for incubation, extraction, and so forth, we also obtain estrololactone in crystalline form, M.P. 337°.

EXAMPLE 6

Estrololactone by cell-free enzyme preparation from *Corynebacterium simplex*

Following the procedure of Example 4, the packed cells are placed in a mortar along with an equal amount by weight of alumina (finely powdered) and treated in a Raytheon magnetostrictive oscillator for twenty minutes. The sonicated mixture is centrifuged for ten minutes at 2000×G to remove the cell debris and alumina.

19-nortestololactone (1 mg.), 2-methyl-naphthoquinone (500 $\mu$g.) and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is extracted with MIBK, acetone and methanol-chloroform in exactly the same manner as described in Example 1. The combined extract is chromatographed on paper using ethylene glycol as the stationary phase and toluene as the mobile phase. A spot moving with the same $R_f$ (0.17) and exhibiting the same characteristic color reactions as the estrololactone obtained in Example 3 is observed.

The invention may be variously otherwise embodied within the scope of the appended claim.

What is claimed is:

1. A process for preparing estrololactone, which comprises subjecting 19-nortestosterone or 19-nor-$\Delta^4$-androstene-3,17-dione to the action of a lactone-producing microorganism selected from the group consisting of *Aspergillus flavipes* and *Aspergillus tamarii* to form 19-nortestololactone, subjecting the 19-nortestololactone to the action of a 1-dehydrogenator microorganism selected from the group consisting of *Corynebacterium simplex, Nocardia restrictus, Pseudomonas testosteroni, Cylindrocarpon radicicola* and *Mycobacterium rhodochrous* and isolating the estrololactone.

References Cited

UNITED STATES PATENTS

| | | |
|---|---|---|
| 2,768,928 | 10/1956 | Fried et al. _____ 195—51 |
| 2,855,404 | 10/1958 | Richards _____ 260—343.2 |
| 2,928,850 | 3/1960 | Herzog et al. __ 195—51(A3135) |
| 2,946,807 | 7/1960 | Fried et al. _____ 195—51 |
| 3,324,153 | 6/1967 | Pan et al. ____ 195—51(A3135) |

ALVIN E. TANENHOLTZ, Primary Examiner